Figure 16:
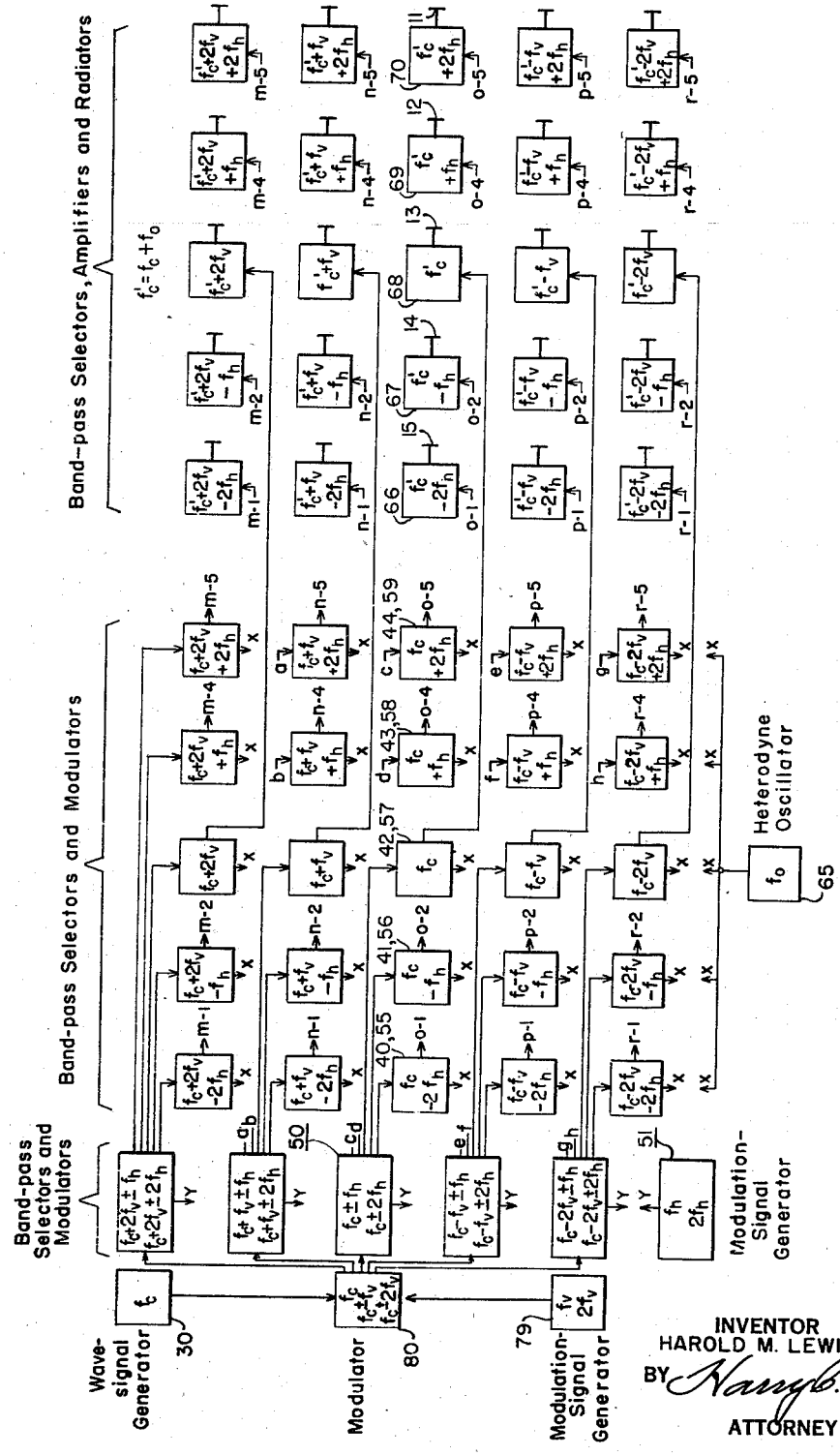

Oct. 28, 1947.     H. M. LEWIS     2,429,726
SYSTEM FOR SPACE-SCANNING WITH A RADIATED WAVE SIGNAL BEAM
Filed Oct. 27, 1943     6 Sheets-Sheet 1
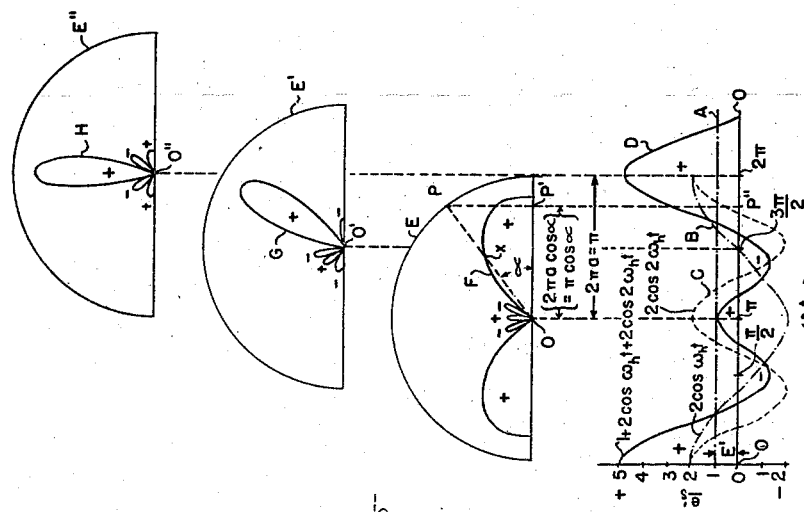
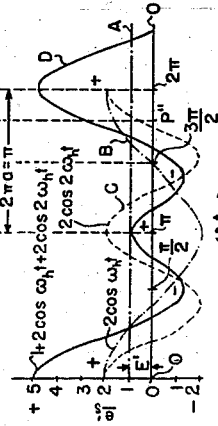
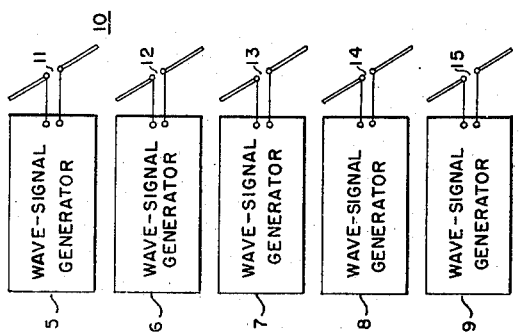
INVENTOR
HAROLD M. LEWIS
BY
ATTORNEY Oct. 28, 1947. H. M. LEWIS 2,429,726
SYSTEM FOR SPACE-SCANNING WITH A RADIATED WAVE SIGNAL BEAM
Filed Oct. 27, 1943 6 Sheets-Sheet 2
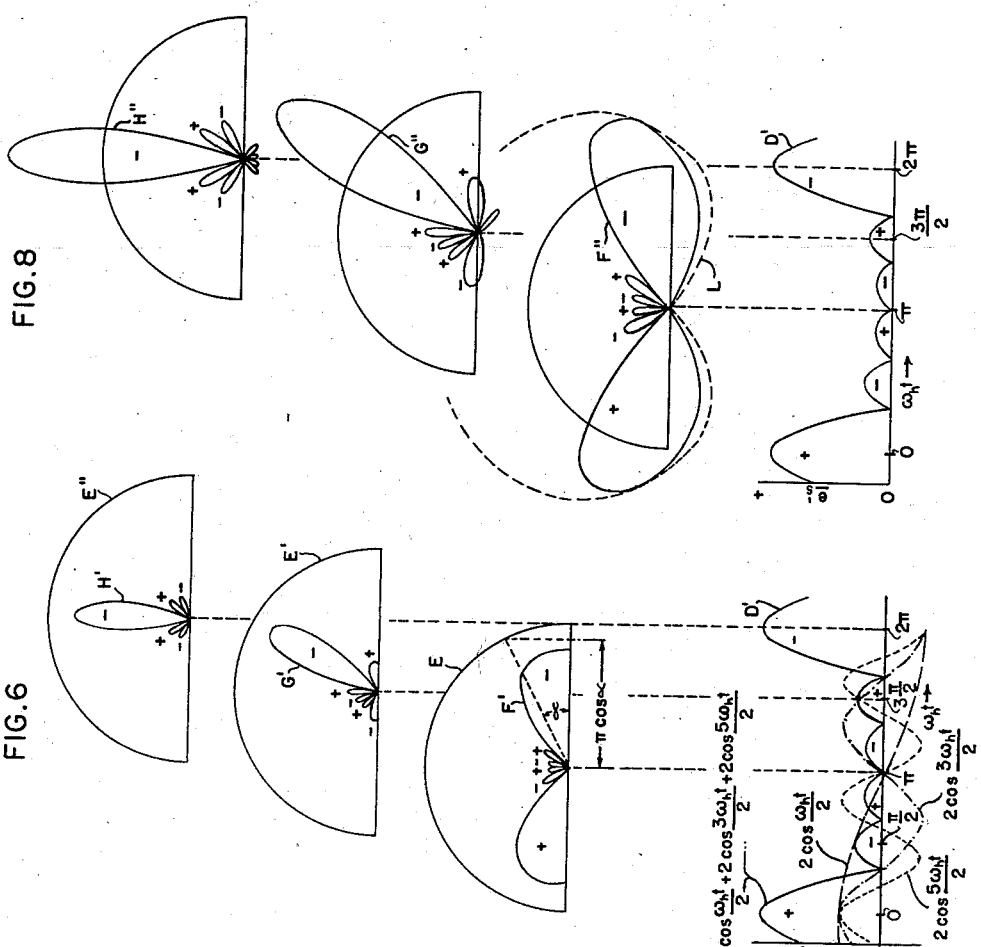
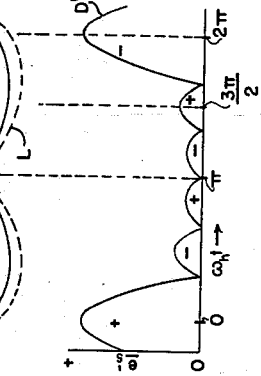
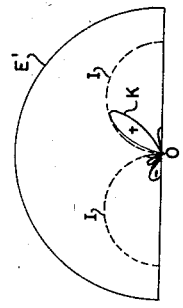
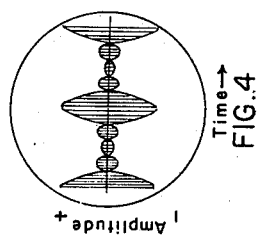
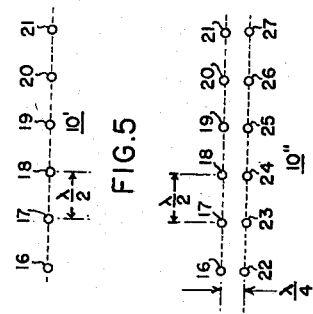
INVENTOR
HAROLD M. LEWIS
BY *Harry C. Page*
ATTORNEY Oct. 28, 1947.   H. M. LEWIS   2,429,726
SYSTEM FOR SPACE-SCANNING WITH A RADIATED WAVE SIGNAL BEAM
Filed Oct. 27, 1943   6 Sheets-Sheet 3
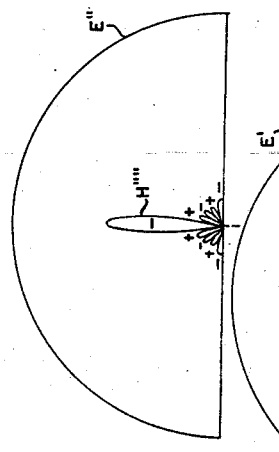
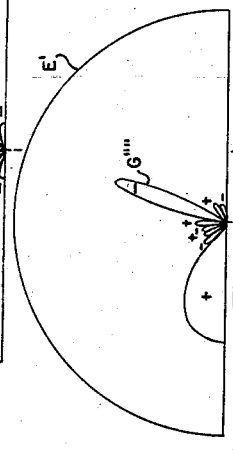
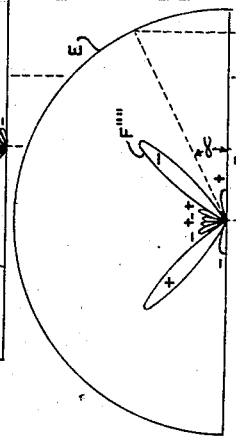
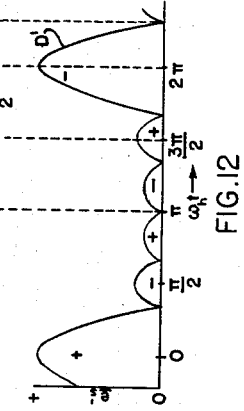
FIG.12
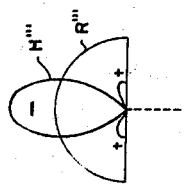
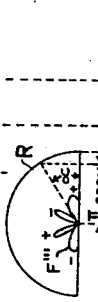
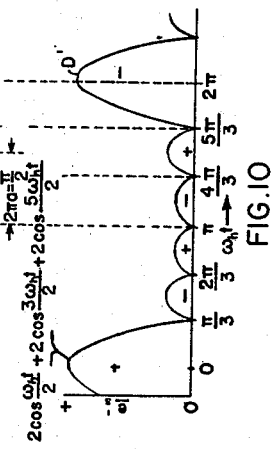
FIG.10
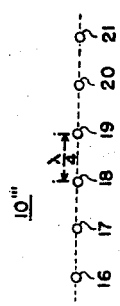
FIG.9
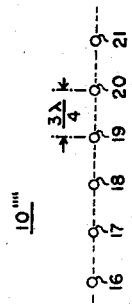
FIG.11
INVENTOR
HAROLD M. LEWIS
BY *Harry S. Page*
ATTORNEY

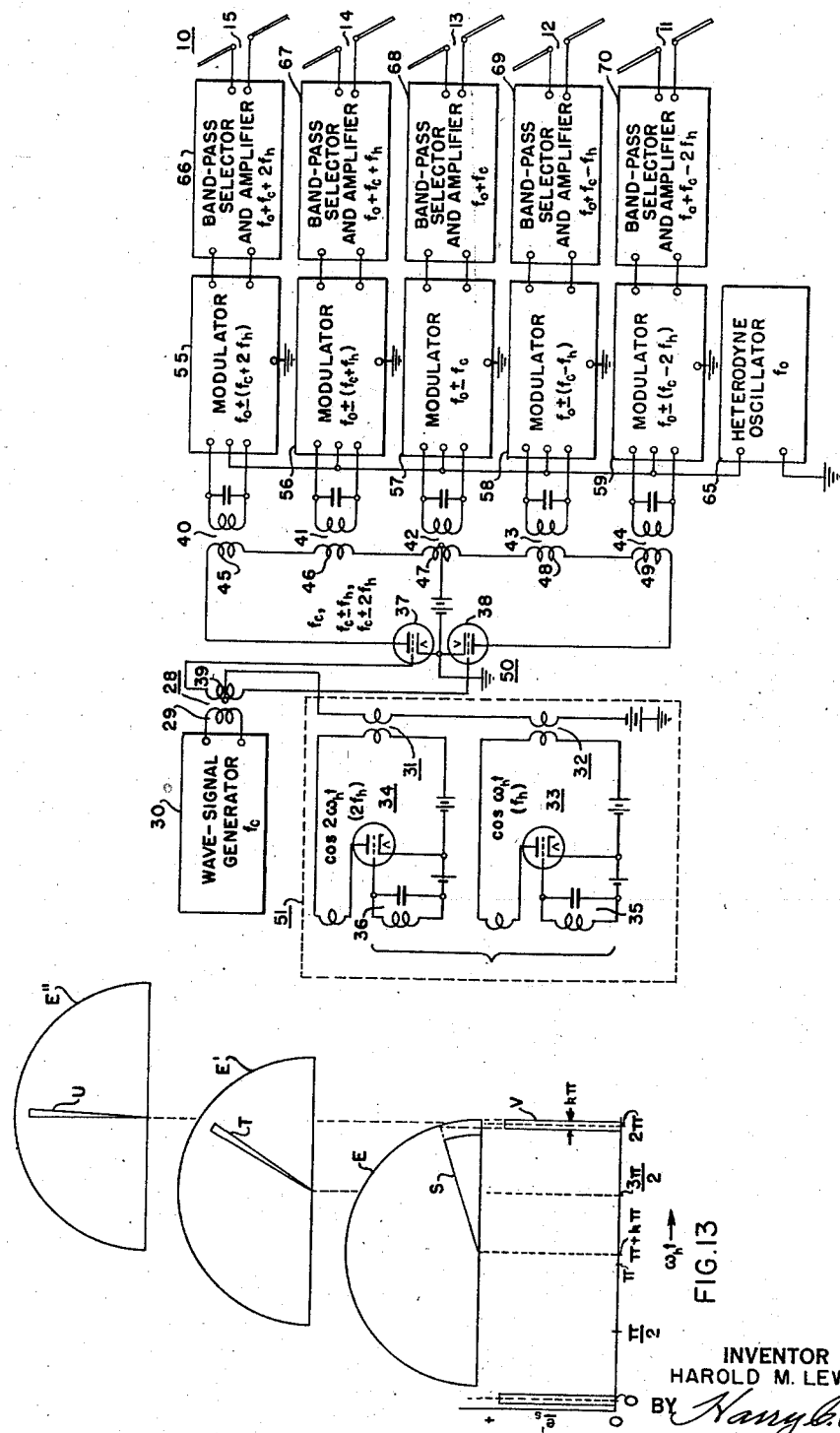

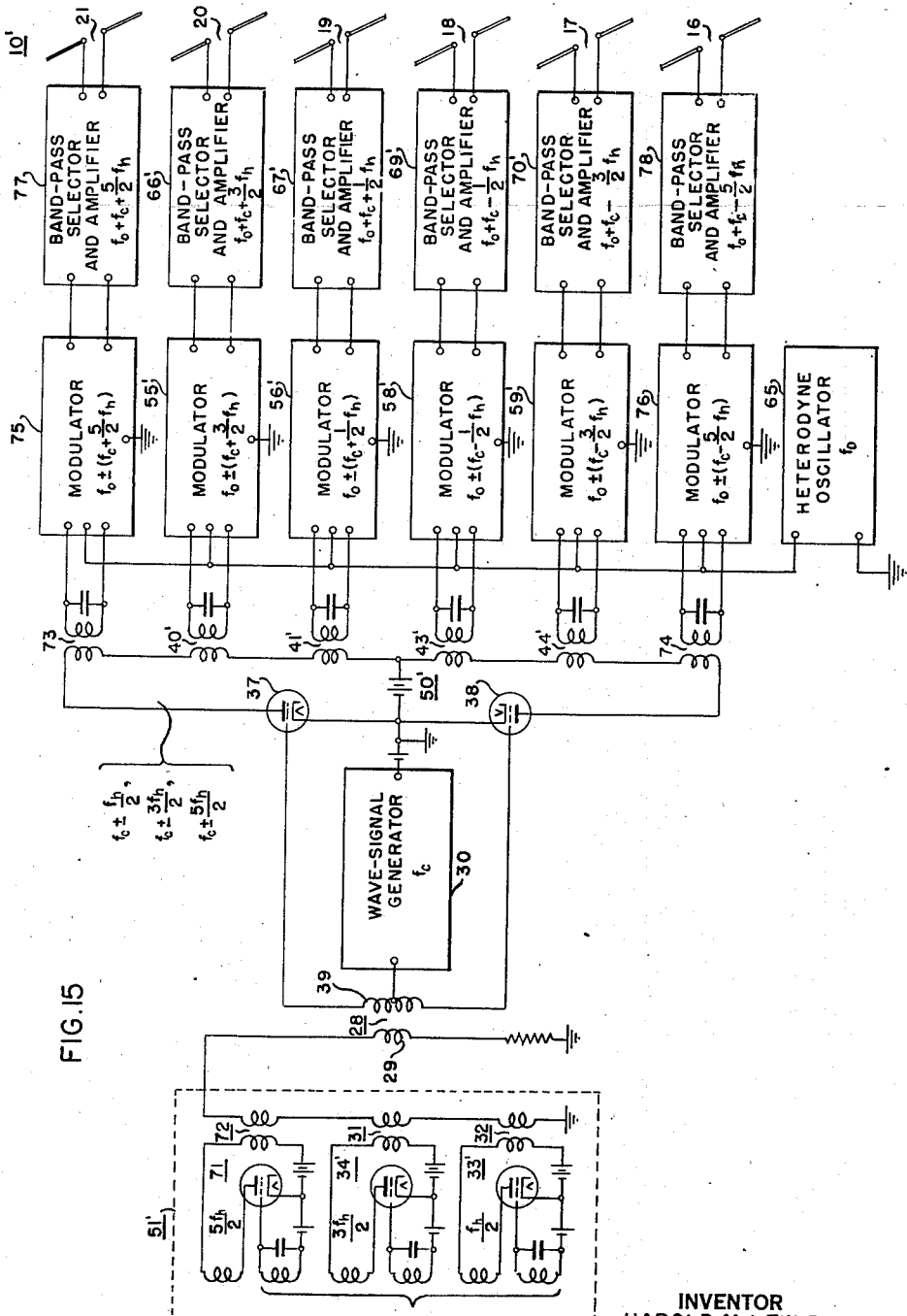

Oct. 28, 1947. H. M. LEWIS 2,429,726
SYSTEM FOR SPACE-SCANNING WITH A RADIATED WAVE SIGNAL BEAM
Filed Oct. 27, 1943 6 Sheets-Sheet 6

INVENTOR
HAROLD M. LEWIS
BY
ATTORNEY

Patented Oct. 28, 1947

2,429,726

UNITED STATES PATENT OFFICE 2,429,726

SYSTEM FOR SPACE SCANNING WITH A RADIATED WAVE-SIGNAL BEAM

Harold M. Lewis, Allenhurst, N. J., assignor, by mesne assignments, to Hazeltine Research, Inc., Chicago, Ill., a corporation of Illinois Application October 27, 1943, Serial No. 507,859

20 Claims. (Cl. 250—11)

The present invention relates to a system for space-scanning with a radiated beam of wave signals and, while the invention is of general application, it is of particular utility in systems of the type disclosed and claimed in the copending application of Harold M. Lewis, Serial No. 507,861, filed October 27, 1943, entitled System for locating a radiated-signal reflector, and assigned to the same assignee as the present application. In the latter system, a predetermined space is scanned with a sharply concentrated radiated beam for the purpose of locating a radiated-signal reflector, such as an aircraft.

It is desirable in numerous applications that a predetermined space be scanned with a sharply concentrated radiated-signal beam. It has been proposed in accordance with numerous prior-art arrangements that this be accomplished by a wave-signal radiator system which has a radiation characteristic in the form of a sharply concentrated beam and which is bodily moved by suitable mechanical apparatus to effect the scanning action. The general disadvantages and limitations of mechanical scanning arrangements are well understood by those skilled in the art. Among these may be mentioned the appreciable power required physically to move the radiator system for purposes of scanning and the fact that the rate of scanning is at best rather low which unduly restricts and limits the usefulness of the system.

A wave-signal scanning system substantially entirely electrical in nature forms the subject matter of copending applications of Arthur V. Loughren, Serial Nos. 395,172 and 418,712, filed May 26, 1941, and November 12, 1941, now Patents 2,407,169 and 2,409,944, issued September 3, 1946, and October 22, 1946, respectively. That system provides that the sharply directive response characteristic of the system be caused to scan a predetermined space by the use of an array of physically spaced wave-signal radiators which are energized through individual wave-signal delay means or phase shifters from a common wave-signal source. The present invention constitutes an improvement on the electrical scanning system of the aforesaid Loughren applications.

It is an object of the present invention, therefore, to provide a new and improved system for scanning a predetermined space with a radiated-signal beam which avoids one or more of the disadvantages and limitations of the prior-art systems of this nature.

It is an additional object of the invention to provide a new and improved mechanically fixed system for scanning a predetermined space with a radiated-signal beam and one which involves a fundamental simplification and improvement of electrical phasing means employed therein to accomplish the desired scanning action.

It is an additional object of the invention to provide a system for scanning a predetermined space with a radiated-signal beam in which either or both the rate of scanning and the shape of the scanning beam may be readily and easily controlled by one or more simple adjustments of wave-signal apparatus included in the system.

It is a further object of the invention to provide a new and improved system for scanning a predetermined space with a radiated-signal beam which is exceptionally well adapted to the type of operation wherein pulse modulation of wave-signal energy translated by the system is utilized to effect high power output of wave-signal translating apparatus relative to the average power capabilities of such apparatus.

In accordance with the invention, a system for scanning a predetermined space with a radiated-signal beam comprises a radiating system including a plurality of spaced signal radiators, and wave-signal supply means coupled to the radiators including means for applying wave signals to at least one of the radiators and means for applying wave signals of a different frequency to another of the radiators. The frequency difference between the wave signals applied to the one and other radiators has a predetermined value related to the desired rate of scanning by the radiated-signal beam, whereby the radiated-signal system angularly scans a predetermined space with a radiated-signal beam.

In accordance with a particular form of the invention, a system of the type described includes means for generating a modulated wave signal having modulation sideband-frequency components, and means for applying at least the sideband-frequency components of the modulated wave signal individually to the radiators with the components of increasing frequency applied to the radiators in the order of spacing thereof from an end radiator of the radiating system.

For a better understanding of the present invention, together with other and further objects thereof, reference is had to the following description taken in connection with the accompanying drawings, and its scope will be pointed out in the appended claims.

Referring to the drawings, Fig. 1 represents schematically a complete radiated-beam scanning system embodying the present invention; Fig. 1A represents the radiating system, per se, of the Fig. 1 arrangement which includes an array of five equally spaced signal radiators; Fig. 2 illustrates a graphical method of determining the directional-radiation characteristic of the radiating system of Fig. 1 in a particular plane and at selected intervals during a scanning cycle; Fig. 3 represents the directional-radiation characteristic of the Fig. 1 radiating system at a selected moment during a scanning cycle and in a plane normal to that selected in Fig. 2; Fig. 4 illustrates the modulation envelope which may be obtained by combining all of the wave-signal energy radiated by the radiators of the Fig. 1 radiating system; Fig. 5 represents a modified form of radiating system and Fig. 6 the directional-radiation characteristic of this system at selected intervals during a scanning cycle; Figs. 7, 9 and 11 represent additionally modified forms of radiating systems and Figs. 8, 10 and 12 represent the respective directional-radiation characteristic of these radiator systems at selected intervals during a scanning cycle; Fig. 13 represents the characteristic of a particular radiating system which includes a large number of radiators and a particular type of energization thereof; Figs. 14 and 15 are circuit diagrams, partly schematic, representing complete systems embodying the present invention in particular forms wherein a predetermined space is scanned in one direction with a radiated-signal beam; and Fig. 16 represents schematically a complete system embodying an additionally modified form of the invention wherein a predetermined space is scanned in two directions, normal to each other, by a radiated-signal beam.

Referring now more particularly to Fig. 1 of the drawings, there is represented schematically a complete system, for scanning a predetermined space in one direction with a radiated-signal beam, embodying the present invention in a particular form. The system includes a radiating system 10 having a plurality of spaced signal radiators 11 to 15, inclusive, which may, for example, be vertical dipole antennas horizontally aligned. The system additionally includes wave-signal supply means coupled to the radiators including means for applying wave signals to at least one of the radiators and means for applying wave signals of a different frequency to another of the radiators, whereby the radiating system 10 angularly scans a predetermined space with a radiated-signal beam. This means comprises a plurality of wave-signal generators 5 to 9, inclusive, individually coupled to the radiators of the radiating system 10. The generated wave signals have individual frequencies increasing in the order of geometric spacing of the radiators in the radiating system and have the same phase at a given reference time. Each of the wave-signal generators may be comprised, for example, of a crystal-controlled oscillator and one or more stages of amplification. The radiators 11 to 15, inclusive, are preferably equally spaced, for example a distance equal to one-half wave length of the wave signal translated by the centrally positioned radiator 13, whereby the radiating system 10 has a radiation characteristic in the form of a sharply concentrated beam or lobe. In this case, the frequencies of the individual wave signals applied to the radiators are equally spaced in the frequency spectrum.

The operation of the scanning system just described may best be understood by a mathematical analysis thereof. The following analysis, which is essentially directed to the Fig. 1 form of scanning system, also includes discussions relating to several modified forms of the present scanning system in order that the scope and character of the invention may be more readily perceived. In the following discussion, the radiators 11 to 15, inclusive, may be considered ideal point radiators. This theoretical approach has the advantage that the directional-radiation characteristic of the radiating system 10 is then the same in all planes which include the axis of alignment of the radiators. The radiators of a conventional system have, in general, individual directional-radiation characteristics, for example the toroidal characteristic of the vertical dipole type of antenna. The disadvantage of starting with a theoretical analysis based on dipole radiators is that the directional-radiation characteristic of the radiating system 10 is then modified by the directional characteristic of its individual radiators and, consequently, varies with the particular plane in which its radiation characteristic is considered.

Preliminary to the mathematical analysis shortly to be presented, certain fundamental characteristics of the radiating system 10 will be considered. Assume that the radiators 11 to 15, inclusive, are excited in the same phase by a common wave signal. This causes the radiating system to have a directional-radiation characteristic of which with a plane including the axis of alignment of the radiators is in the form of a sharply concentrated beam or major lobe. The direction of this lobe is determined by the spacing of the radiators and the phase relationships of the wave-signal energy applied thereto. Additionally, for a predetermined spacing of the radiators, the direction of the major lobe can be changed by simultaneously varying the phase relationships between each pair of adjacent radiators of the radiating system. Now, in accordance with the invention, scanning of a predetermined space with the radiated-signal beam or major lobe is effected by continuously varying in a predetermined manner the phase relationships of the wave signals translated by adjacent pairs of radiators. It is pointed out hereinafter in greater detail, particularly in connection with Equations 1 to 5, inclusive, that this is satisfied by the application to adjacent pairs of radiators of wave signals of different frequencies. The term "phase relationship" is arbitrarily used herein in referring to waves of different frequencies to mean the difference in phase angle of the waves at any given instant. The phase angle, of course, varies continuously and is zero according to the present definition when both waves have their positive maxima at the same time.

A sinusoidal variation of directivity of the major lobe is effected by causing the phase difference between the wave signals translated by adjacent radiators to vary linearly with time. Conversely, the major lobe of radiation varies in direction at substantially constant angular velocity when the phase difference between wave-signal energy translated by adjacent radiators is caused to vary sinusoidally with time. Sinusoidal scanning of space by the radiated-signal beam or major lobe of the radiating system 10 possesses particular advantages relating largely to the construction and operation of the wave-signal apparatus of the scanning system. This type of scanning will form the basis of the following mathematical analysis.

At the outset, consider only two radiators of the radiating system and assume that the relative excitations of the two radiators are given by the relations:

$$e_0 = E_0 \cos \omega_c t \quad (1)$$
$$e_1 = E_1 \cos (\omega_c t + \phi) \quad (2)$$

where $e_0$ = the instantaneous voltage of the wave signal translated by one radiator.
$E_0$ = the maximum voltage of the wave signal translated by the one radiator.
$\omega_c = 2\pi f$ where $f$ is the frequency of the applied wave signal.
$t$ = time.
$e_1$ = the instantaneous voltage of the wave signal translated by the second of the pair of radiators.
$E_1$ = the maximum amplitude of the wave signal translated by the second radiator, this wave signal being assumed for the moment to have the same frequency as the wave signal translated by the first radiator.
$\phi$ = the instantaneous phase difference in radians between the wave signals translated by the pair of radiators.

The directional-radiation characteristic for this pair of radiators has a major lobe in a direction which varies with the phase angle $\phi$. The major lobe of radiation can be caused sinusoidally to scan a predetermined space, as previously mentioned, by making the phase angle $\phi$ vary linearly with time; that is, by causing the phase angle $\phi$ to vary in accordance with the relation:

$$\phi = 2\pi f_h t \quad (3)$$
or
$$\phi = \omega_h t \quad (4)$$

where $f_h$ = the frequency of variation of the phase angle $\phi$; and
$\omega_h = 2\pi f_h$ It will be seen from Equations 2 and 4 that the wave signal translated by the second radiator may also be expressed by the relation:

$$e_1 = E_1 \cos (\omega_c + \omega_h) t \quad (5)$$

Equation 5 makes at once evident the fact that a linear variation of the phase angle $\phi$ is effected in accordance with the invention simply by applying to the second radiator a wave signal of higher frequency than that applied to the first radiator of the pair. However, this pair of radiators may be any selected pair of adjacent radiators of the radiating system 10. Hence, for linear array of radiators which are equally spaced, a sinusoidal scanning of a predetermined space by the major radiation lobe of the radiating system is effected by exciting the several radiators with individual wave signals of different frequencies such that the frequency difference between adjacent radiators is constant. The frequency of scanning is equal to the difference $f_h$. Thus, the greater the frequency difference $f_h$, the faster the scanning action; conversely, the smaller the frequency difference the slower the rate of scanning.

The major radiation lobe which is characteristic of the radiating system 10, has a configuration determined both by the radiator spacing and the frequency spacing of the several applied wave signals. This will perhaps best be understood by the following mathematical analysis and the graphical solution of mathematical equations resulting therefrom. For purposes of this analysis, the radiating system 10 is shown in Fig. 1A alone and without associated wave-signal apparatus.

Consider again one pair of adjacent radiators of the radiating system 10, for example the radiators 13 and 14, and assume that they are excited by wave signals having the same frequency but relative phase differences $\phi$. Further assume that the wave-signal translated by the radiator 13 is expressed by Equation 1. The wave-signal received at a predetermined distant point P from the radiator 13 can then be expressed by the relation:

$$e'_{13} = E'_{13} \cos \omega_c t \quad (6)$$

where $E'_{13}$ = the maximum amplitude of the wave signal received at the point P due to radiation from the radiator 13.

The wave signal translated by the radiator 14 and received at the same distant point P differs from that received from the radiator 13 by two phase components, one due to the phase difference $\phi$ of the wave signals translated by the radiators 13 and 14 and the other due to the physical spacing of the latter from the former. Thus, assuming for the moment that the wave signal applied to the radiator 14 has the same frequency as that applied to the radiator 13, the wave signal received at the distant point P from the radiator 14 may be expressed by the relation:

$$e'_{14} = E'_{14} \cos (\omega_c t + \phi + 2\pi \frac{d}{\lambda} \cos \alpha) \quad (7)$$

where $E'_{14}$ = the maximum amplitude of the wave signal received at the distant point due to radiation from the radiator 14.
$\alpha$ = the angle which the direction of the distant point P makes with the axis of alignment of the radiators 13 and 14.
$d$ = the spacing of the radiators 13 and 14 expressed in arbitrary units.
$\lambda$ = the wave length of the wave signals translated by the radiators 13 and 14 expressed in the same units as $d$.

The equation 7 may be rewritten in the form:

$$e'_{14} = E'_{14} \cos [(\omega_c t + \phi + 2\pi a \cos \alpha)] \quad (8)$$

where $$a = \frac{d}{\lambda}$$

Now in accordance with the invention, the phase difference $\phi$ between the wave signals translated by the radiators 13 and 14 is made to vary linearly with time so that the major lobe of radiation angularly scans a predetermined space. This is accomplished by applying to the radiator 14 a carrier wave of frequency different from that applied to the radiator 13. When this is done, $\phi = \omega_h t$, and Equation 8 becomes:

$$e'_{14} = E'_{14} \cos [(\omega_c + \omega_h) t + 2\pi a \cos \alpha] \quad (9)$$

For the preferred case, where all of the radiators 11 to 15, inclusive, of the radiating system 10 have equal spacings and are excited by individual wave signals having individual frequencies equally spaced in the frequency spectrum and increasing in frequency in the order of positioning of the radiators in the direction from radiator 11 to radiator 15, it can be readily shown by similar analysis that the wave signals received at the distant point P from the radiators 15, 12 and 11 are given by the respective relations:

$$e'_{15} = E'_{15} \cos [(\omega_c + 2\omega_h) t + 4\pi a \cos \alpha] \quad (10)$$
$$e'_{12} = E'_{12} \cos [(\omega_c - \omega_h) t - 2\pi a \cos \alpha] \quad (11)$$
$$e'_{11} = E'_{11} \cos [(\omega_c - 2\omega_h) t - 4\pi a \cos \alpha] \quad (12)$$

The wave-signal energy received at the distant point P from all of the radiators of the radiating system 10 is, of course, the algebraic sum of the wave-signal energy received from each individual radiator and is obtained by algebraic addition of Equations 6 and 9 to 12, inclusive. Assume for simplicity that the wave signals applied to the radiators of the radiating system 10 have equal amplitudes. The algebraic sum $e'_s$ of Equations 6 and 9 to 12, inclusive, is expressed after simplification by the relation:

$$e'_s = E'[1 + 2\cos(\omega_h t + 2\pi a \cos \alpha) + 2\cos 2(\omega_h t + 2\pi a \cos \alpha)]\cos \omega_c t \quad (13)$$

It is important to note in connection with Equation 13 that the radiator spacing factor $a$ is related solely to the wave length of the wave signal applied to the radiator 13; that is, to the wave length of a wave signal having the nominal frequency of all of the wave signals applied to the radiating system. This concept of relating antenna spacings to the nominal-frequency wave signal is consistently followed herein and should be carefully kept in mind to avoid possible confusion.

A method of graphically solving Equation 13 will now be described. This method is particularly useful: first, for quickly and accurately ascertaining the configuration of the major and minor lobes of radiation for any given number and spacing of radiators in the radiating system; secondly, the manner in which a change of radiator spacing, considered in terms of the wave length of the nominal wave-signal frequency and thus being related both to the physical spacing of the radiators and to the nominal wave-signal frequency, affects the configuration of the major and minor radiation lobes; and, thirdly, in clearly evidencing the fact that the rate of scanning is determined solely by the frequency separation of the applied wave signals and that the frequency separation does not in any manner affect the configuration of the radiation lobes. This method of solution also is effective to disclose the presence of undesired minor or spurious lobes of radiation and the manner in which such lobes are affected by changes of the parameters of the radiating system. The usefulness of the method of solution is not restricted to ideal point radiators, but is able to take into account the directive characteristics of radiators having directional-radiation characteristics and of reflector systems used therewith to increase, in a desired direction, the energy of radiated wave signals.

Fig. 2 represents a graphical solution of Equation 13 and shows the directional-radiation characteristic of the radiating system 10 of Fig. 1 at three selected intervals during a scanning cycle. This graphical solution, presently to be considered in detail, is premised upon the fact that the directivity coefficient $2\pi a \cos \alpha$ occurs in every term of Equation 13 involving $\omega_h t$. Equation 13 is thus plotted over a range of values of $\omega_h t$ under the condition that $$\alpha \text{ equals } \frac{\pi}{2}$$

and hence that the directivity coefficient $2\pi a \cos \alpha$ equals zero. The directivity coefficient of $2\pi a \cos \alpha$ is then separately plotted. When this is done, a selected value of $\omega_h t$ simply has added thereto phase increments, graphically determined from the plot of the directivity coefficient, corresponding to selected values of $\alpha$. The values of Equation 13 for the selected value of $\omega_h t$ and the selected values of $\alpha$ can be read directly from the first graphical solution and are plotted against corresponding values of $\alpha$ to obtain the configuration of the radiation lobes for the selected value of $\omega_h t$.

Considering now in greater detail the several steps involved in the graphical solution, the multiplying factor of the first term of Equation 13 is a potential component of constant amplitude and is plotted to scale a unit distance $E'$ above the reference axis 0—0, as indicated by the broken line A. The multiplying factor of the second term of Equation 13 is $$2E' \cos(\omega_h t + 2\pi a \cos \alpha)$$

This term is plotted, as indicated by the dot-dash curve B, for a range of values of $\omega_h t$ under the condition that $$\alpha \text{ equals } \frac{\pi}{2}$$

and thus that $2\pi a \cos \alpha$ equals zero. Similarly, the multiplying factor of the third term of Equation 13 is plotted, as indicated by the broken-line curve C, over the same range from 0 to $2\pi$ also for the condition that $2\pi a \cos \alpha$ equals zero.

The sum of these terms is shown in Fig. 2 by the solid-line curve D. Equation 13 will be readily recognized as the equation corresponding to a modulated carrier wave having a carrier wave component $E \cos \omega_c t$ and modulation signal components expressed by the second and third terms of the equation. The equation of the modulation envelope is, of course:

$$e'_m = E' + 2E' \cos(\omega_h t + 2\pi a \cos \alpha) + 2E' \cos 2(\omega_h t + 2\pi a \cos \alpha) \quad (13a)$$

It will thus be evident that curve D may also be said to represent one-half of the amplitude-modulation envelope of such carrier wave except that the negative loops of this curve would appear above the 0—0 axis. The unit level represented by curve A corresponds to the level of the unmodulated carrier wave. It will be evident from this that a carrier wave modulated in accordance with a modulation signal having the wave form represented by curve D is over-modulated, such over-modulation occurring during times when curve D lies below the axis 0—0. Since over-modulation effects a reversal of polarity of a radiated wave signal, the areas under curve D where over-modulation does not occur are indicated as plus areas and those where over-modulation occurs are indicated as minus areas, this designation being carried over into the directional-radiation characteristic of the radiating system presently to be plotted.

It may be noted at this point that had Equation 13 contained additional terms, each such additional term would have been plotted in the manner described and would have been added with the other terms to derive curve D.

The manner in which the directional-radiation characteristic of the radiating system 10 is constructed from curve D for any given value of $\omega_h t$ will now be described. Assume that the directional-radiation characteristic is desired for the value of $\omega_h t = \pi$. A construction circle E is first drawn with its center $o$ vertically above the scale value $\omega_h t = \pi$ and with a radius equal to $2\pi a$. The parameter $a$ is defined in connection with Equation 8 as related to the wave length at which the radiators of the radiating system are spaced. Hence, for the radiating system 10 of Fig. 1 where the value of $a$ is one-half, the radius of the construction circle E is $\pi$. On this construction circle a radius OP is drawn at any angle $\alpha$. The distance O—P' is equal to $2\pi a \cos \alpha$ or $\pi \cos \alpha$ since the radius OP is equal to $\pi$. Hence, the projected point P'' on the axis 0—0 corresponds to a phase displacement of $\omega_h t + 2\pi a \cos \alpha = \pi + \pi \cos \alpha$. This is the value of phase angle which occurs in both the second and third terms of Equation 13. Hence, the amplitude of curve D for this phase angle provides a solution of Equation 13 for the chosen values of $\omega_h t$ and $\alpha$. Equation 13, however, gives the value of the total wave-signal energy radiated by the radiating system 10 and received at the distant point P. The latter, of course, lies in a direction governed by the selected angle $\alpha$. The value of Equation 13 thus graphically obtained from curve D is measured from the center O of the construction circle E along the radius OP and defines one point $x$ on the directional-radiation characteristic of the radiating system. This same constructional procedure for radii drawn for other values of $\alpha$ locates other similar points and a smooth line drawn through the points thus determined provides the directional-radiation characteristic curve for the radiating system 10, as indicated by curve F of Fig. 2, for the assumed condition that $\omega_h t = \pi$. The lower half of curve F is not shown for simplicity. It may be constructed in the same manner, if desired, but is a mirror image of the upper half shown.

Assume now that the directional-radiation characteristic of the radiating system 10 is desired for the value $$\omega_h t = \frac{3\pi}{2}$$

The construction circle E' in this case has its center O' located vertically above the scale value $$\omega_h t = \frac{3\pi}{2}$$

on the axis 0—0. The constructional procedure hereinbefore described is again carried out and the resulting curve G represents the upper half of the directional-radiation characteristic of the radiating system for this assumed value of $\omega_h t$. The curve H is derived in the same manner and represents the upper half of the directional-radiation characteristic of the radiating system 10 for the assumed value $\omega_h t = 2\pi$.

Curves F, G, and H of Fig. 2 make at once apparent the fact that the major lobe of radiation scans from the radiator to which the highest-frequency wave signal is applied towards the radiator having the lowest applied frequency. Under the conditions above assumed, the scanning is from the radiator 15 toward the radiator 11.

As previously stated, if the radiators 11 to 15, inclusive, of the radiating system 10 of Fig. 1 be considered ideal point radiators, then curves F, G, and H of Fig. 2 represent the directional-radiation characteristic of the radiating system for the assumed values of $\omega_h t$ considered with respect to any plane which includes the radiators. On the other hand, if the radiators have a directional-radiation characteristic, for example if they are comprised of vertical dipole antennas, then curves F, G and H represent the directional-radiation characteristic of the radiating system 10 only in one plane, for example the horizontal plane.

The foregoing described method of graphically determining the directional-radiation characteristic of a radiation system is also applicable to one comprised of radiators which have similar individual directional-radiation characteristics. In this case, it is only necessary to consider that the individual radiators have a nondirectional characteristic in the desired plane and then to modify the radiation-characteristic pattern thus obtained by the coefficient of directivity of the radiators in that plane. Fig. 3 illustrates this for a radiation system of the type shown in Fig. 1 but comprised of vertical dipole antennas vertically aligned. It is assumed that the directional-radiation characteristic desired is that in a vertical plane which includes the radiators. It is further assumed in deriving the characteristic of Fig. 3 that $\omega_h t$ has the value $$\frac{3\pi}{2}$$

and thus, were it not for the directional-radiation characteristic of the individual radiators, the directional characteristic would conform to curve G of Fig. 2. As is well known, the directive coefficient in a vertical plane of a vertical dipole antenna is approximately the magnitude of $\cos \alpha$ and this function is plotted as curve I of Fig. 3. The amplitude of any point of curve G, Fig. 2, for a given value of $\alpha$, which curve is based on the assumption of nondirectivity as between the various planes including the axis of the antenna array, is then multiplied by the coefficient of directivity of the individual radiators to obtain for the same angle $\alpha$ a corresponding point on the directional-radiation characteristic curve sought. The resultant curve K, Fig. 3, thus represents the vertical-plane directional-radiation characteristic for the radiating system 10 when comprised of vertical dipole radiators vertically aligned.

The statement has hereinbefore been made that curve D of Fig. 2 corresponded to the envelope of an amplitude-modulated carrier wave. If the wave-signal energy translated by all of the radiators of the radiating system 10 were directly combined while maintaining intact their phase relationships and applied to the vertical electrodes of an oscilloscope, there would be traced on the screen of the oscilloscope the over-modulated wave-signal pattern shown in Fig. 4. Consider now the more general case of a radiating system having any finite number of radiators. By mathematical deduction from Equation 13, it can be shown that the directional-radiation characteristic of any radiating system embodying the present invention and having an odd number of aligned radiators is given by the relation:

$$e = E\left[K_0 + 2\sum_{m=1}^{m=m'} K_m \cos m(\omega_h t + 2\pi a \cos \alpha)\right] \cos \omega_c t$$

(14)

where $K_0$ and $K_m$ = arbitrary constants having values related to the amplitudes of excitation of the radiators (they have unity value in the case where the antennas are excited in equal amplitude); and $m$ = the number of the term in the series, the last term $m'$ of which is determined by the following expressions:

$n$ = the number of radiators $$m' = \frac{n-1}{2}$$

The amplitudes of minor spurious lobes may be reduced, at a sacrifice of maximum power in the major lobe, by exciting the several radiators with unequal amplitudes. Equation 14 yet applies in this case if the radiators considered in pairs from the center radiator have equal excitations.

In a manner similar to that used in deriving Equation 13, it can be shown that the directional-radiation characteristic for a radiating system having six radiators excited as described with equal amplitudes is:

$$e = E\left[2 \cos \frac{1}{2}(\omega_h t + 2\pi a \cos \alpha) + 2 \cos \frac{3}{2}(\omega_h t + 2\pi a \cos \alpha) + 2 \cos \frac{5}{2}(\omega_h t + 2\pi a \cos \alpha)\right] \cos \omega_c t \quad (15)$$

By mathematical deduction from Equation 15, it can be shown that the directional-radiation characteristic of any radiating system embodying the present invention and having an even number of aligned radiators is given by the relation:

$$e = E\left[2 \sum_{m=1}^{m=m'} K_m \cos\left[\left(\frac{2m-1}{2}\right)\left(\omega_h t + 2\pi \frac{d}{\lambda} \cos \alpha\right)\right]\right] \cos \omega_c t \quad (15a)$$

where $K_m$ = an arbitrary constant, the value of which is related to the amplitudes of excitation of the radiators; and $m$ = the number of the term in the series, the last term $m'$ of which is determined by the following expressions:

$n$ = the number of radiators $$n = 2m'$$

Equation 15a applies to the case of either equal or unequal excitation of the radiators, provided only that for the condition of unequal excitation the radiators considered in pairs from the center point of the radiating system shall have equal excitations.

Fig. 5 represents a radiating system 10' of this type. The system includes the radiators 16—21, inclusive. The graphical solution of Equation 15 for the radiating system of Fig. 5 is represented by curve D' of Fig. 6 and is effected in the manner described in connection with Equation 13 and Fig. 2. One-half of the directional-radiation characteristic of the radiating system 10' is represented by curves F', G' and H' corresponding to assumed values of $\omega_h t$ of $\pi$, $$\frac{3\pi}{2}$$

and $2\pi$, respectively, which are derived from curve D' by the graphical method hereinbefore described in connection with Fig. 2. A comparison of the characteristic curves of Figs. 6 and 2 shows that the addition of one radiator to the Fig. 5 radiating system 10' slightly sharpens the major radiation lobe but adds one minor or spurious radiation lobe.

The radiating system 10" of Fig. 7 is similar to the radiating system 10' of Fig. 5, corresponding members being designated by similar reference numerals, except that a plurality of radiators 22—27, inclusive, are positioned one-quarter wave length behind corresponding ones of the radiators 16—21, inclusive, and carry the same current as the latter but are excited in phase quadrature therewith. The manner of graphically determining the directional-radiation characteristic of the radiating system 10" is similar to that described above in connection with Fig. 3, the directional-radiation characteristic for any assumed value of $\omega_h t$ being modified by the directive coefficient of an individual pair of transverse radiators of the radiating system. The directivity coefficient of an individual pair of transverse radiators, for example the radiators 16 and 22, in a plane which includes their axis of alignment is given by the relation:

$$d = 2 \cos\left[\frac{\pi}{4}(\sin \alpha - 1)\right] \quad (16)$$

This coefficient is plotted as curve L of Fig. 8 and is used in deriving curves F", G", and H" which represent the complete directional-radiation characteristic of the radiating system 10" for assumed values of $\omega_h t$ equal to $\pi$, $$\frac{3\pi}{2}$$

and $2\pi$, respectively. The directivity curve L used in deriving each of curves G" and H" is not shown for purposes of simplicity. It may here be noted that, whereas in Fig. 6 curves F', G' and H' represent only one-half of the directional-radiation characteristic of the radiating system of Fig. 5, in Fig. 8 the curves F", G" and H" show the complete directional-radiation characteristic of the radiating system of Fig. 7. Hence, it will be evident that the added radiator elements 22—27, inclusive, concentrate in one direction the energy of the wave signals translated by the radiator system 10".

The radiating system 10'" of Fig. 9 is essentially similar to that of Fig. 5, similar elements being designated by similar reference numerals, except that the radiators are spaced only one-quarter wave length as indicated. Assume that the wave signals individually translated by the radiators 16—21, inclusive, have the same frequencies as those translated by the corresponding radiators of the Fig. 5 radiating system, so that the curve D' of Fig. 10 corresponds to the same curve of Fig. 6 and represents the graphical solution of Equation 15. Curves F'", M, N and H'" of Fig. 10 represent one-half of the directional-radiation characteristics of the radiating system 10'" for four selected values of $\omega_h t$; namely, $\pi$, $$\frac{4\pi}{3}, \frac{5\pi}{3}$$

and $2\pi$, respectively.

It will be evident from these curves that a decrease of the spacing of the radiators of the radiating system materially modifies the major lobe of radiation and, in general, tends greatly to broaden it. A decrease of radiator spacing may, of course, be effected either by a change of physical spacing while maintaining constant the nominal frequency of the applied wave signals or by maintaining constant the physical spacing of the radiators and changing the nominal frequency of the applied wave signals.

The radiating system 10"" of Fig. 11 is essentially similar to the radiating system 10' of Fig. 5, similar elements being designated by similar reference numerals, except that the radiators of the former are spaced three-quarters wave length. The curve D' of Fig. 12 is identical to the corresponding curve of Fig. 6, thus indicating that the wave signals translated by the radiators of the radiating system 10"" have the same frequencies as those translated by the corresponding radiators of the radiating system 10' of Fig. 5. The curves F"", G"" and H"" represent one-half of the directional-radiation characteristics of the radiating system $10''''$ for three selected value of $\omega_h t$ equal to $\pi$, $$\frac{3\pi}{2}$$

and $2\pi$, respectively. It will be noted that the radius of the construction circle E is, by definition $2\pi a$, equal to $$\frac{3\pi}{2}$$

Curve $F''''$ shows that during a portion of the scanning cycle two major lobes of radiation are present by virtue of this wider spacing of the radiators. While the major lobes of radiation are sharpened by the increased spacing of the radiators, the presence of two major lobes during a portion of the scanning cycle may sometimes be objectionable.

In many applications, it is desirable that a system for scanning a predetermined space with a radiated-signal beam shall be of such type that the system shall have only a signal sharply concentrated major lobe of radiation during a scanning cycle and shall be free of undesired minor or spurious lobes of radiation. From the foregoing description of the invention and its operation, it will now be apparent that this may be easily and readily effected in a system embodying the present invention by the provision of a radiating system which includes a sufficiently large number of spaced signal radiators and associated reflector or director radiators and means for applying to the radiators individual wave signals having individual amplitudes and frequencies properly related to others of the wave signals translated by the radiating system. For example, and referring to Fig. 13, curves S, T and U represent the directional-radiation characteristics at selected values of $\omega_h t$, presently to be considered in greater detail, for a radiating system which includes a relatively large number of radiators spaced by one-half wave length. The number of radiators employed in the radiating system is sufficiently large that the graphical solution of general Equation 14 is represented approximately by the idealized curve V of Fig. 13. Curve V is characteristic of a pulse-modulated wave signal in which each pulse has a width $k\pi$ determined by the number of cosine terms in general Equation 14 and thus by the number of radiators in the radiating system. It follows that a large number of radiators provides a small duration of the pulse and a sharp lobe of radiation. There are no minor or spurious lobes of radiation. It can be shown by a Fourier analysis of the wave form of curve V that the constants $K_0$ and $K_m$ of Equation 14 are no longer equal, as was the case in deriving Equations 13 and 15, but vary from term to term of the equation. The exact spacing of the radiators of the radiating system, if the latter is to have any given time in a scanning cycle only one major lobe of radiation, is given by the relation:

$$d = \frac{\lambda}{2} - \frac{k\lambda}{4} \qquad (17)$$

where $\lambda$ = the wave length of the mean frequency of the wave signals translated by the radiating system, and $k\lambda$ = the width of a pulse of curve V.

A spacing of the radiators greater than the value given in Equation 17 causes the radiating system to have portions of two major lobes of radiation at the time when one cycle of scanning is just ending and the succeeding cycle just starting. Curves T and U of Fig. 13 represent the directional-radiation characteristics of such a system at selected values of $\omega_h t$ equal to $$\frac{3\pi}{2}$$

and $2\pi$, respectively, while curve S represents the characteristic for the value of $\omega_h t$ equal to $\pi + k\pi$. The curves of Fig. 13 are applicable to a radiating system which includes either an even or odd number of radiators, the only difference being that alternate major lobes of radiation have opposite polarity for an even number of radiators, but all of the major lobes of radiation have the same polarity where odd numbers of radiators are employed.

Before proceeding to the consideration of a particular form of the invention, another aspect of the operation of the invention will first be considered. Referring again to Equation 5 and the ensuing discussion thereof, the wave signals individually applied to the equally spaced radiators of the radiating system 10 may be expressed by the following relations wherein the subscripts designate an individual radiator:

$$e_{13} = E_{13} \cos \omega_c t \qquad (18)$$
$$e_{14} = E_{14} \cos (\omega_c + \omega_h) t \qquad (19)$$
$$e_{15} = E_{15} \cos (\omega_c + 2\omega_h) t \qquad (20)$$
$$e_{12} = E_{12} \cos (\omega_c - \omega_h) t \qquad (21)$$
$$e_{11} = E_{11} \cos (\omega_c - 2\omega_h) t \qquad (22)$$

where $\omega_c$ = the angular frequency of the wave signal applied to the radiator 13.

Consider that the wave signals individually expressed by Equations 18 to 22, inclusive, are individual-frequency components of a common wave-signal source. The expression for the wave signal of this common source is derived by the addition of Equations 18 to 22, inclusive, and is, after simplification of terms, given by the following relation, which assumes that $E_{11}$ to $E_{15}$, inclusive, all have the value E:

$$e_s = E \cos \omega_c t (1 + 2 \cos \omega_h t + 2 \cos 2\omega_h t) \qquad (23)$$

It will be evident upon inspection that Equation 23 corresponds to that of a modulated wave signal having a carrier-wave component given by the relation:

$$e_0 = E \cos \omega_c t \qquad (24)$$

and a modulation-signal envelope given by the relation:

$$e_m = (1 + 2 \cos \omega_h t + 2 \cos 2\omega_h t) \qquad (25)$$

It will further be recognized that the modulation signal components represent a modulation signal having two frequency components. In accordance with accepted modulation theory, the first term of Equation 23 is the carrier-wave component, the second term comprises upper and lower sideband modulation components spaced $\omega_h t$ from the carrier-wave component, and the third term also comprises upper and lower modulation sideband components spaced $2\omega_h t$ from the carrier-wave component.

It can be shown that the most general form of Equation 23, applicable to a radiating system which includes an odd number of radiators excited by wave signals having individual amplitude values such that, when combined, they effectively produce a wave signal modulated with a periodic-pulse signal, is given by the relation:

$$e_s = E\left[K_0 + 2\sum_{m=1}^{m=m'} K_m \cos m\omega_h t\right] \cos \omega_c t \quad (26)$$

where $$K_m = \frac{\sin mb\pi}{m\pi b(1-b)}$$

$K_0$ = a constant which defines the relative amplitude of excitation of the center radiator of the radiating system (when the radiators are excited by wave signals of equal amplitude, $K_m$ has unity value and $K_0$ is equal to $K_m$), $m$ = the number of the term in the series, the last term $m'$ of which is determined by the following relations:

$n$ = the number of radiators $$m' = \frac{n-1}{2}$$

$1-b$ = the fraction of the pulse period during which a pulse of the pulse-modulation signal occurs.

In similar manner, it can be shown that the most general form of equation, analogous to Equation 26, applicable to a radiating system which includes an even number of radiators excited by wave signals having individual amplitude values such that, when combined, they effectively produce a wave signal modulated with a periodic-pulse signal is given by the relation:

$$e_s = E\left[(1-(-1)^m)\sum_{m=1}^{m=m'} K_m \cos m\frac{\omega_h t}{2}\right] \cos \omega_c t \quad (26a)$$

where $m$ = the number of the term in the series, the last term $m'$ of which is determined by the following expressions:

$n$ = the number of radiators $$m' = n-1$$

and the remaining parameters are as previously defined. The general Equations 26 and 26a will be of interest in cases where wave signals having different amplitudes are applied to individual radiators of the radiating system, thus providing one method of reducing the amplitude of minor or spurious lobes of radiation relative to the major lobe, as hereinbefore noted in connection with Fig. 13. The major lobes in this case then corresponds to, or is determined by, a predetermined value of pulse interval $b$ and pulse duration $(1-b)$ of the periodic-pulse signal in that they establish the value of the coefficient $K_m$ for any term $m$ of Equations 26 and 26a. In this type of operation, the value of the coefficient $K_0$ in Equation 26 for the odd-number radiator case should preferably be so chosen that the wave defined by the equation is modulated at least to zero amplitude during intervals between pulses of the periodic-pulse signal. Where the maximum power output of the individual generators 5–9, inclusive, is limited and it is desired to have the maximum possible energy in a single major lobe, the amplitude of the wave signals applied to the individual radiators will be equal. This means that all of the K coefficients are made equal to unity in the appropriate one of the general Equations 26 and 26a. It can be shown that the $K_m$ coefficients approach unity as the quantity $(1-b)$ approaches zero, which means, of course, that the pulse duration of the periodic-pulse signal then becomes very short and approaches zero. Equation 23 may be directly obtained from Equation 26 under the last-named condition for the case of five radiators.

For the case of an even number of radiators, the following equation is derived from general Equation 26a under the condition that all of the K coefficients of the latter are made equal to unity:

$$e_s = E\left[2\cos\frac{\omega_h t}{2} + 2\cos\frac{3\omega_h t}{2} + 2\cos\frac{5\omega_h t}{2} + \ldots 2\cos\frac{(2m-1)}{2}\omega_h t\right] \cos \omega_c t \quad (27)$$

The importance of the modulation concept of the present invention will become more apparent during the following discussion of modified forms of scanning systems embodying the present invention.

Referring now to Fig. 14 of the drawings, there is represented a circuit diagram, partly schematic, of a complete system for scanning a predetermined space with a radiated-signal beam which embodies the present invention in a preferred form. This system is essentially similar to that of Fig. 1, similar circuit elements being designated by similar reference numerals, except that the present system includes means for generating a modulated wave signal having modulation sideband-frequency components and means for applying at least the sideband-frequency components of the modulated wave signal individually to the radiators of the radiating system with the components of increasing frequency applied to the radiators in the order of spacing thereof from the end radiator of the radiating system.

In greater particularity, the system includes a first input circuit comprising an input transformer 28 having a primary winding 29 adapted to have applied thereto a wave signal, of frequency $f_c$, from a wave-signal generator 30. The system additionally includes a second input circuit comprising transformers 31 and 32 adapted to have applied thereto a modulation signal having frequency components related to the desired spacing of the radiators 11—15, inclusive, of the radiating system 10 from a reference point common to all of the radiators. This modulation signal in the present system has two frequency components $f_h$ and $2f_h$ and are developed by a modulation-signal generator 51 having two synchronized oscillators 33 and 34. The oscillator 33 is of conventional type having an input circuit 35 tuned to the frequency $f_h$ and having an output circuit coupled to the modulation-signal input-circuit transformer 32. Similarly, the oscillator 34 is of conventional type having an input circuit 36 tuned to the frequency $2f_h$ and having an output circuit coupled to the transformer 31 of the modulation-signal input circuit. The oscillatory circuits of these oscillators are mutually coupled to maintain the oscillators closely synchronized.

The scanning system also includes means responsive to the applied wave signal and to the modulation signal for deriving a modulated wave signal and for applying individual modulation-frequency components thereof to the radiators of the radiating system 10, whereby the radiating system 10 angularly scans a predetermined space with a radiated-signal beam. This last-named means comprises a balanced modulator 50 including vacuum tubes 37 and 38. The input electrodes of vacuum tubes 37 and 38 are coupled in push-pull relation to the secondary winding 39 of the input transformer 28, the secondary winding 39 having a center tap which is connected to the cathodes of tubes 37 and 38 through a series circuit which includes the secondary winding of each of the modulation-signal input transformers 31 and 32. There are included in the output circuits of the vacuum tubes 37 and 38 a plurality of tuned coupling transformers 40—44, inclusive, which individually couple a pair of modulators 55 and 56 to the output circuit of tube 37, a second pair of modulators 58, 59 to the output circuit of tube 38, and a modulator 57 to the output circuits of both of tubes 37 and 38.

The transformers 40—44, inclusive, are individually so tuned that they apply to the modulators 55—59, inclusive, individual frequency components of the modulated wave signal developed in the output circuit of the preceding modulator stage 37, 38. Specifically, the transformer 42 is tuned to the carrier-wave component; that is, to the frequency $f_c$ of the wave signal generated by the generator 30. The transformer 41 is tuned to the lowest-frequency component $f_c+f_h$ appearing in the upper modulation sideband of the modulated wave signal. The transformer 40 is tuned to the next higher-frequency component $f_c+2f_h$ of the upper modulation sideband. In similar manner, the transformers 43 and 44 are tuned to the highest and next highest, respectively, frequency components $f_c-f_h$ and $f_c-2f_h$ of the lower modulation sideband of the modulated wave signal.

For reasons presently to be explained, the scanning system includes a heterodyne oscillator 65 having an output circuit coupled to the input circuit of each of the modulators 55—59, inclusive.

The output circuits of the modulators 55—59, inclusive, are, respectively, coupled through band-pass selector and amplifier units 66—70, inclusive, to individual ones of the radiators 11—15, inclusive, of the radiating system 10, as shown.

Considering now the operation of the scanning system just described, and referring again to the curves of Fig. 2, the oscillator 33 generates one frequency component, the wave form of which is expressed by the relation $\cos \omega_h t$, of the modulation signal. One cycle of this frequency component may be considered as represented in Fig. 2 by the curve B. The oscillator 34 generates a second modulation-signal frequency component, the wave form of which is given by the relation $\cos 2\omega_h t$, and two complete cycles of this component may be considered as represented in Fig. 2 by curve C. These modulation-signal frequency components are combined in the input circuit of the modulator stage 50 to provide the modulation signal which may be considered as represented by curve D of Fig. 2. The wave signal generated by the generator 30 is modulated by this modulation signal in the modulator stage 50. Since there are two frequency components of the modulation signal, the modulated wave signal will have upper and lower modulation sidebands each including two modulation-signal frequency components and will have a carrier-wave component. The transformers 40—44, inclusive, select, in the order of decreasing frequencies, individual ones of the modulation components and apply them to the respective modulators 55—59, inclusive.

The frequency of the wave signal generated by generator 30 is preferably sufficiently low that the separation of the modulation components may be readily effected by the transformers 40—44, inclusive. The modulation component applied to each of the modulators 55—59, inclusive, is heterodyned to a higher frequency suitable for radiation by the heterodyne oscillator 65. The heterodyne components developed in the output of modulators 55—59, inclusive, are applied to the respective units 66—70, inclusive. Preferably, the sum-frequency heterodyne components are selected by the band-pass selectors of the latter units and, after amplification by the respective amplifiers thereof, are applied to the radiators 11—15, inclusive, of the radiating system 10. The wave signals thus applied to the radiators 11—15, inclusive, have individual frequencies equally spaced in the frequency spectrum. The amplifiers of units 66—70, inclusive, preferably have relative gains such that the amplitudes of the wave signals applied to the radiators of the radiating system 10 are equal. Assuming that the radiators 11—15, inclusive, of the radiating system 10 are vertical dipole antennas, as indicated, and are arranged in horizontal alignment, it will be evident from the foregoing description of the invention that the directional-radiation characteristic of the radiating system 10 in a horizontal plane is represented by Curves F, G and H of Fig. 2 for respective values of $\omega_h t$ equal to $\pi$, $$\frac{3\pi}{2}$$

and $2\pi$.

One further important characteristic of a radiated-signal system embodying the present invention should be considered. This feature is characteristic not only of the Fig. 14 arrangement described, but also of the Fig. 15 and 16 modifications presently to be described. Referring to Fig. 2, it will be noted that the directivity coefficient $2\pi a \cos \alpha$ involves a radiator spacing factor $a$ the value of which is related only to the nominal frequency of the wave signal supplied to the radiating system 10 and is entirely independent of the period of $\omega_h t$. On the other hand, the period of $\omega_h t$ is independent of the radiator spacing and the nominal wave-signal frequency. It is thus evident that the rate of scanning by the major radiation lobe may be readily controlled, since it is determined simply by the value of the frequency components $f_h$ and $2f_h$ of the modulation signal generated by the generator 51, and may be varied at will simply by adjustment of the operating frequencies of the oscillators 33 and 34. Any variation of frequency of these oscillators affects only the rate of scanning and does not affect in any manner the configuration of either the major or minor radiation lobes. Conversely, variations of frequency of the wave-signal generator 30 affect only the configuration of the radiation lobes, this generator establishing the nominal frequency of the wave signal supplied to the radiated system 10, and has no effect on the rate of scanning. The importance of these features, characteristic of the radiated-signal system of the present invention, will be at once apparent to one skilled in the art.

Fig. 15 is a circuit diagram, partly schematic, of a complete scanning system of the type described which is essentially similar to the Fig. 14 arrangement, similar circuit elements being designated by similar reference numerals and analogous circuit elements by similar reference numerals primed, except that the present arrangement utilizes a radiating system 10' having an even number of radiators 16—21, inclusive, as in the Fig. 5 radiating system. Referring to Equation 15 and to the curves of Fig. 6 which represent the directional-radiation characteristic of the radiating system 10' of Fig. 5, it will be noted that the modulation signal includes the three frequency-component terms $$\cos \frac{1}{2}\omega_h t, \cos \frac{3}{2}\omega_h t, \text{ and } \cos \frac{5}{2}\omega_h t$$

These frequency-component terms, when added, give a modulation signal of wave form such as that represented by curve D' of Fig. 6. Hence, the modulation-signal generator 51' of the present arrangement includes an oscillator 33' to provide the modulation-signal frequency component $$\cos \frac{1}{2}\omega_h t$$

an oscillator 34' to provide the component $$\cos \frac{3}{2}\omega_h t$$

and an oscillator 71 to provide the component $$\cos \frac{5}{2}\omega_h t$$

These oscillators are synchronized by mutual coupling, as in the Fig. 14 arrangement. The output of the modulation signal generator 51' is applied in push-pull or opposite phase to the input electrodes of the vacuum tubes 37 and 38, while the wave signal generated by the generator 30 is applied in the same phase to these vacuum tubes, thus providing a balanced modulator 50' of the carrier-suppressor type. This type of modulator is one in which the carrier component is suppressed in the modulator output circuit leaving only the modulation sideband-frequency components therein. The transformers 40', 41', 43', 44', 73 and 74 are coupled to the output circuit of the balanced modulator and are individually tuned to these modulation sideband components. In this connection, it will be understood that the primary windings of the transformers 40', 41', 43', 44', 73 and 74 are all inductively coupled to ensure balanced output of the modulator 50', as is well known. These selected components are individually applied to the modulators 55', 56', 58', 59', 75 and 76, together with heterodyne oscillations generated by the heterodyne oscillator 65. Of the heterodyne components developed in the output circuit of the latter modulators, preferably the sum-frequency components are selected and amplified by units 66', 67', 69', 70', 77 and 78, after which they are individually applied to the radiators of the radiating system 10'.

It will be apparent that the wave signals thus individually applied to the radiators of the radiating system 10' are equally spaced in the frequency spectrum, that is, have the same frequency difference between any adjacent pair of radiators.

The present arrangement thus includes means, comprising the modulation-signal generator 51', the wave-signal generator 30, and the balanced modulator 50' for generating a modulated wave signal having a suppressed carrier component and equally spaced upper and lower sideband modulation-frequency components. It also includes means for applying the upper sideband modulation components of the modulated wave signal to the radiators 19, 20 and 21, which are positioned on one side of the center point of the radiating system 10', with the components of increasing frequency applied in order to the radiators in the order of spacing thereof from the center point. There is additionally included means for applying the lower sideband modulation components of the modulated wave signal to the others of the radiators 16, 17 and 18 of the radiating system 10' with the components of decreasing frequency applied in order to the radiators in the order of spacing thereof from the center point.

The selector and amplifiers 66', 67', 69', 70', 77 and 78 are preferably so adjusted that the amplitudes of the wave signals applied to the radiators of the radiating system 10' are equal. Under this condition and assuming that the radiators of the radiating system 10' are comprised by vertical dipole antennas as indicated, are horizontally aligned and are spaced one-half wave length, the directional-radiation characteristic of the radiating system is represented by the curves F', G', and H' of Fig. 6 for the respective values of $\omega_h t$ equal to $\pi$, $$\frac{3\pi}{2}$$

and $2\pi$.

If desired, the selector-amplifier units 66–70, inclusive, of the Fig. 14 arrangement, or the selector-amplifier units 66', 67', 69', 70', 77 and 78 of the Fig. 15 system, may each be replaced by a wave-signal generator or may each include such generator. Where this is done, in the Fig. 14 embodiment for example, the selected heterodyne-frequency component which is developed in the output circuits of the modulators 55–59, inclusive, are used to synchronize the wave-signal generator included in associated succeeding units 66–70, inclusive. An arrangement of this nature may be desirable in those applications where the units 66–70, inclusive, would otherwise not be capable of providing the necessary high-power output required from the system.

The additionally modified form of the invention schematically shown in Fig. 16 is a complete radiated-signal system adapted to scan with a radiated-signal beam a predetermined space in two directions normal to each other. The scanning pattern of this system is in the nature of a raster of parallel lines similar to that employed in an image pickup or an image-reproducing tube of a conventional television system.

The radiated-signal system of Fig. 16 is essentially similar to that of Fig. 14, except that the former arrangement may be said to embody a plurality of systems of the Fig. 14 type each operating at slightly different nominal or mean operating frequencies. All of the elements of the Fig. 14 arrangement are designated in Fig. 16 by the same reference numerals and it will be understood that the unnumbered elements in Fig. 16, which occupy positions corresponding to numbered elements in Fig. 16, are identical in all respects thereto except for the frequencies translated by each, these frequencies being appropriately designated in Fig. 16. The present system includes, in addition to the horizontal-scanning modulation-signal generator 51 of the Fig. 14 arrangement, a vertical-scanning modulation-signal generator 79 the output circuit of which is coupled to an input circuit of a modulator 80. Also coupled to an input circuit of the latter unit is the wave-signal generator 30. It will be evident from the foregoing description of the invention that the frequency components of the modulated wave signal developed in the output circuit of the modulator 80 are thus suitably spaced in the frequency spectrum to effect vertical scanning by the radiated-signal beam when suitably applied to a radiating system in the manner taught above. These modulation components are individually selected and applied to a second bank of modulators, which includes the modulator 50, where the selected modulation components are treated as individual wave signals and are each modulated by the horizontal-scanning modulation signals of the generator 51. The modulation components of these several signals are indicated by the frequency designations in Fig. 16. See, for example, the frequency designations related to modulator 50 and, in each case, a particular one of these modulation components is selected and translated by a particular one of the units designated "band-pass selectors and modulators." These last-named components are heterodyned to a higher frequency by the heterodyne oscillator 65, suitably amplified, and individually applied to the radiators of the radiating system which, in the present arrangement, are grouped into arrays, in the manner of the radiators 11–15, inclusive, and at least one bank of arrays. Each such array of radiators may conveniently be considered a row thereof and corresponding radiators in the bank of arrays may similarly be considered as columns of radiators.

It will be noted from the frequency designations applied to Fig. 16 that the radiators have applied thereto wave signals having individual frequencies which increase in the order of spacing of the radiators in each array, for example from left to right in Fig. 16, and which increase in the order of spacing of each array in the bank of arrays, for example from bottom to top in Fig. 16, thus to provide a radiated-signal system which angularly scans, with a radiated-signal beam, in two directions normal to each other. The frequency differences between the wave signals applied to the radiators in each array and between the wave signals applied to corresponding radiators, or column of radiators, in the bank of arrays have predetermined values related to the desired rates of scanning by the radiated-signal beam in the two directions. That is, the wave signals applied to any adjacent pair of radiators in an array have a frequency difference $f_h$, whereby the radiated-signal beam scans in a first or horizontal direction at a first and preferably high scanning rate, whereas the wave signals applied to any adjacent pair of radiators in a column thereof have a frequency difference $f_v$, thus to cause the radiated-signal beam to scan in a second or vertical direction at a second and preferably low rate of scanning. The resulting scanning pattern is thus one of parallel scanning lines which may be interlaced, if desired, as in conventional television practice.

The scanning system of the present invention is particularly suitable for operation as a pulse-modulation system. When operated in this manner, the wave signal generated by the generator 30, for example, may be amplitude-modulated, either in the generator itself or in a succeeding modulator stage, not shown, by a modulation signal having a periodic-pulse wave form with the duration of each pulse thereof short in relation to their period of recurrence. An arrangement of this nature has the important advantage that all apparatus utilized to translate the wave signal or its modulation components may be operated with high peak power output relative to its average power capabilities and thus effect a greatly increased effective power gain for the scanning system as a whole in a manner well understood by those skilled in the art. In a system of this nature, the major lobe of radiation does not continuously scan a predetermined space but rather scans the space in discrete steps, there being one such step for each pulse of the periodic-pulse modulation signal. The period of the latter may be so chosen that the major lobe scans in a number of discrete steps as it scans through an angle of 180 degrees. Alternatively, the period between pulses may be so long and the duration of each pulse so short that the major lobe is developed in only one direction during each 180 degrees of scanning but successive cycles of scanning change in successive discrete steps, the direction in which the major lobe is developed thus providing a system of overlapped steps of discrete scanning. The last suggested mode of operation may be used with a very rapid rate of scanning, as where $\omega_h$ is large, and will have the effect of providing a much lower effective scanning rate. Also, the period between pulses of the modulation signal of periodic-pulse wave form may be such that the discrete steps of scanning during one scanning cycle intervene between those of a preceding cycle of scanning, thus providing an interlaced system of scanning.

It was pointed out in connection with the directional-radiation patterns of Fig. 2, for example, that only one-half of the radiation pattern was there shown for purposes of simplicity. In many applications, it is desirable that the occurrence of two major scanning lobes extending in opposite directions be avoided. It will be apparent that this can be accomplished simply by providing suitable director radiators or a suitable reflector structure in association with the radiating system 10, as in the radiating system 10″ of Fig. 7, or by any one of similar numerous arrangements which will occur to one skilled in the art. Where it is desired that the major lobe of radiation shall scan only over a limited angle smaller than 180 degrees, this may most readily be accomplished by a type of pulse modulation, previously suggested, wherein a suitable pulse-modulation signal so controls the operation of the system that wave signals are applied to the radiators only during the time when the major radiation lobe scans through the desired scanning angle.

While there have been described what are at present considered to be the preferred embodiments of this invention, it will be obvious to those skilled in the art that various changes and modifications may be made therein without departing from the invention, and it is, therefore, aimed in the appended claims to cover all such changes and modifications as fall within the true spirit and scope of the invention.

What is claimed is:

1. A system for scanning a predetermined space with a radiated-signal beam comprising, a radiating system including a plurality of spaced signal radiators, and wave-signal supply means coupled to said radiators including means for applying wave signals to at least one of said radiators and means for applying wave signals of a different frequency to another of said radiators, the frequency difference between the wave signals applied to said one and said other radiator having a predetermined value related to the desired rate of scanning by said radiated-signal beam, whereby said radiated-signal system angularly scans a predetermined space with a radiated-signal beam.

2. A system for scanning a predetermined space with a radiated-signal beam comprising, a radiating system including a plurality of spaced signal radiators, and wave-signal supply means coupled to said radiators including means for applying wave signals to at least one of said radiators and means for applying wave signals of a different frequency to another of said radiators, the frequency difference between the wave signals applied to said one and said other radiators having a predetermined value related to the physical spacing of said one and said other radiator and to the desired rate of scanning by said radiated-signal beam, whereby said radiated-signal system angularly scans a predetermined space with a radiated-signal beam.

3. A system for scanning a predetermined space with a radiated-signal beam comprising, a radiating system including an array of aligned and spaced signal radiators, and wave-signal supply means coupled to said radiators including means for applying wave signals to at least one of said radiators and means for applying wave signals of a different frequency to another of said radiators, the frequency difference between the wave signals applied to said one and said other radiator having a predetermined value related to the desired rate of scanning by said radiated-signal beam, whereby said radiated-signal system angularly scans a predetermined space with a radiated-signal beam.

4. A system for scanning a predetermined space with a radiated-signal beam comprising, a radiating system including a plurality of spaced signal radiators, and wave-signal supply means coupled to said radiators including means for applying wave signals to at least one of said radiators and means for applying to others of said radiators individual wave signals of individual frequencies different from that of the wave signal applied to said one radiator but spaced in the frequency spectrum in accordance with the relative spacing of said other radiators with relation to said one radiator, the frequency differences between the wave signals applied to said radiators having predetermined values related to the desired rate of scanning by said radiated-signal beam, whereby said radiated-signal system angularly scans a predetermined space with a radiated-signal beam.

5. A system for scanning a predetermined space with a radiated-signal beam comprising, a radiating system including a plurality of equally spaced signal radiators, and wave-signal supply means coupled to said radiators including means for applying wave signals to at least one of said radiators and means for applying to others of said radiators individual wave signals of individual frequencies different from that of the wave signal applied to said one radiator but equally spaced in the frequency spectrum with relation thereto, the frequency difference between the wave signals applied to adjacent ones of said radiators having a predetermined value related to the desired rate of scanning by said radiated-signal beam, whereby said radiated-signal system angularly scans a predetermined space with a radiated-signal beam.

6. A system for scanning a predetermined space with a radiated-signal beam comprising, a radiating system including a plurality of spaced signal radiators, and wave-signal supply means coupled to said radiators including means for applying to at least one of said radiators wave signals of substantially constant frequency and means for applying to another of said radiators wave signals of substantially constant but different frequency, the frequency difference between the wave signals applied to said one and said other radiator having a predetermined value related to the desired rate of scanning by said radiated-signal beam, whereby said radiated-signal system angularly scans a predetermined space with a radiated-signal beam.

7. A system for scanning a predetermined space with a radiated-signal beam comprising, a radiating system including a plurality of geometrically spaced radiators, and wave-signal supply means coupled to said radiators including means for applying to said radiators individual wave signals having individual frequencies increasing in the order of geometric spacing of said radiators, the frequency differences between the wave signals applied to said radiators having predetermined values related to the desired rate of scanning by said radiated-signal beam, whereby said radiated-signal system angularly scans a predetermined space with a radiated-signal beam.

8. A system for scanning a predetermined space with a radiated-signal beam comprising, a radiating system including a plurality of spaced signal radiators, and a plurality of wave-signal generators individually coupled to said radiators for applying a wave signal to at least one of said radiators and a wave signal of different frequency to another of said radiators, the frequency difference between the wave signals applied to said one and said other radiator having a predetermined value related to the desired rate of scanning by said radiated-signal beam, whereby said radiated-signal system angularly scans a predetermined space with a radiated-signal beam.

9. A system for scanning a predetermined space with a radiated-signal beam comprising, a radiating system including a plurality of spaced signal radiators, and wave-signal supply means coupled to said radiators including means for applying to said radiators wave signals having individual frequencies corresponding to at least individual modulation components of a modulated wave signal, the frequency differences between the wave signals applied to said radiators having predetermined values related to the desired rate of scanning by said radiated-signal beam, whereby said radiated-signal system angularly scans a predetermined space with a radiated-signal beam.

10. A system for scanning a predetermined space with a radiated-signal beam comprising, a radiating system including a plurality of spaced signal radiators, an input circuit adapted to have applied thereto a wave signal, and means responsive to said applied wave signal for deriving a plurality of wave signals of individual different frequencies and for applying at least said derived wave signals individually to said radiators, the frequency differences between the wave signals applied to said radiators having predetermined values related to the desired rate of scanning by said radiated-signal beam, whereby said radiated-signal system angularly scans a predetermined space with a radiated-signal beam.

11. A system for scanning a predetermined space with a radiated-signal beam comprising, a radiating system including a plurality of spaced signal radiators, means for generating a modulated wave signal having modulation sideband-frequency components, and means for applying at least said sideband-frequency components individually to said radiators with the components of increasing frequency applied in order to said radiators in the order of spacing thereof from an end radiator of said radiating system, the frequency differences between the modulation components applied to said radiators having predetermined values related to the desired rate of scanning by said radiated-signal beam, whereby said radiated-signal system angularly scans a predetermined space with a radiated-signal beam.

12. A system for scanning a predetermined space with a radiated-signal beam comprising, a radiating system including a plurality of spaced signal radiators, a first input circuit adapted to have applied thereto a wave signal, a second input circuit adapted to have applied thereto a modulation signal having frequency components proportional to the spacing of said radiators from a reference point common to all thereof, and means responsive to said applied wave signal and to said modulation signal for deriving a modulated wave signal and for applying individual modulation-frequency components thereof to said radiators, whereby said radiated-signal system angularly scans a predetermined space with a radiated-signal beam.

13. A system for scanning a predetermined space with a radiated-signal beam comprising, a radiating system including an uneven number of equally spaced signal radiators, means for generating a modulated wave signal having equally spaced modulation sideband-frequency components, means for applying the carrier component of said modulated wave signal to the center one of said radiators, means for applying the upper sideband modulation components individually to those radiators which are positioned on one side of said one radiator with the components of increasing frequency applied in order to the radiators in the order of spacing thereof from said one radiator, and means for applying the lower modulation sideband components individually to those radiators which are positioned on the opposite side of said one radiator with the modulation components of decreasing frequency applied in order to the radiators in the order of spacing thereof from said one radiator, whereby said radiated-signal system angularly scans a predetermined space with a radiated-signal beam.

14. A system for scanning a predetermined space with a radiated-signal beam comprising, a radiating system including an even number of equally spaced signal radiators, means for generating a modulated wave signal having a suppressed carrier component and equally spaced upper and lower sideband-modulation-frequency components, means for applying the upper sideband modulation components of said modulated wave signal individually to those radiators which are positioned on one side of the center point of said radiating system with the components of increasing frequency applied in order to said radiators in the order of spacing thereof from said center point, and means for applying the lower sideband modulation components of said modulated wave signal individually to the others of said radiators with the components of decreasing frequency applied in order to said radiators in the order of spacing thereof from said center point, whereby said radiated-signal system angularly scans a predetermined space with a radiated-signal beam.

15. A system for scanning a predetermined space with a radiated-signal beam comprising, a radiating system including an odd number $n$ of equally spaced radiators, means for generating a modulated wave signal having maximum voltage E and instantaneous voltage $e_s$ given by the relation $$e_s = E\left[K_0 + 2\sum_{m=1}^{m=m'} K_m \cos m\omega_h t\right] \cos \omega_0 t$$

where the summation of terms of the equation defines a wave signal effectively modulated by a signal of periodic-pulse wave form having an interval $b$ between pulses thereof and a pulse duration $(1-b)$, $m$ is the number of the term in the series the last term $m'$ of which has the value $$\frac{n-1}{2}$$

$K_0$ is a constant defining the relative amplitude of excitation of the center radiator of said radiating system, $K_m$ has a value $$\frac{\sin mb\pi}{mb\pi(1-b)}$$

$\omega_h$ is equal to $2\pi$ times the fundamental frequency $f_h$ of said pulse-modulation signal, $\omega_0$ is equal to $2\pi$ times the frequency $f_0$ of the wave signal, and $t$ represents time, and means for selecting and applying the modulation components of said wave signal individually to said radiators with the components of increasing frequency applied in order to said radiators in the order of spacing thereof from an end radiator of said radiating system, the frequency differences between the modulation components applied to said radiators having predetermined values related to the desired rate of scanning by said radiated-signal beam, whereby said radiated-signal system angularly scans a predetermined space with a radiated-signal beam.

16. A system for scanning a predetermined space with a radiated-signal beam comprising, a radiating system including an even number $n$ of equally spaced radiators, means for generating a modulated wave signal having maximum voltage E and instantaneous voltage $e_s$ given by the relation $$e_s = E\left[(1-(-1)^m)\sum_{m=1}^{m=m'} K_m \cos m\frac{\omega_h t}{2}\right] \cos \omega_c t$$

where the summation of terms of the equation defines a wave signal effectively modulated by a signal of periodic-pulse wave form having an interval $b$ between pulses thereof and a pulse duration $(1-b)$, $m$ is the number of the term in the series the last term $m'$ of which has the value $(n-1)$, $K_m$ has the value $$\frac{\sin mb\pi}{mb\pi(1-b)}$$

$\omega_h$ is equal to $2\pi$ times the fundamental frequency $f_h$ of said pulse-modulation signal, $\omega_0$ is equal to $2\pi$ times the frequency $f_0$ of the wave signal, and $t$ represents time, and means for selecting and applying the modulation components of said wave signal individually to said radiators with the components of increasing frequency applied in order to said radiators in the order of spacing thereof from an end radiator of said radiating system, the frequency difference between the modulation components applied to said radiators having predetermined values related to the desired rate of scanning by said radiated-signal beam, whereby said radiated-signal system angularly scans a predetermined space with a radiated-signal beam.

17. A system for scanning a predetermined space with a radiated-signal beam comprising, a radiating system including a plurality of signal radiators grouped into arrays and at least one bank of arrays, and wave-signal supply means coupled to said radiators including means for applying to said radiators wave signals having individual frequencies which increase in the order of spacing of said radiators in each array and increase in the order of spacing of each array in said bank or arrays, the frequency differences between the wave signals applied to the radiators in each array and between the wave signals applied to corresponding radiators in said bank or arrays having predetermined values related to the desired rates of scanning by said radiated-signal beam in two directions, whereby said radiated-signal system angularly scans with a radiated-signal beam and in two directions normal to each other a predetermined space.

18. A system for scanning a predetermined space with a radiated-signal beam comprising, a radiating system including a plurality of signal radiators grouped substantially into rows and columns of radiators, and wave-signal supply means coupled to said radiators including means for applying to said radiators wave signals having individual frequencies which increase in the order of spacing of said radiators in each row and increase in the order of spacing of said radiators in each column, the frequency differences between the wave signals applied to the radiators in each row and the frequency differences between the wave signals applied to the radiators in each column having predetermined values relating to the desired rates of scanning by said radiated-signal beam in two directions, whereby said radiated-signal system angularly scans with a radiated-signal beam and in two directions normal to each other a predetermined space.

19. A system for scanning a predetermined space with a radiated-signal beam comprising, a radiating system including a plurality of signal radiators grouped into arrays and at least one bank of arrays, and wave-signal supply means coupled to said radiators including means for applying to said radiators wave signals having individual frequencies which increase in the order of spacing of said radiators in each array and increase in the order of spacing of each array in said bank of arrays, the value of frequency of a wave signal applied to any one radiator in said radiating system being related both to the distance of said one radiator from a point common to all of the radiators in the array which includes said one radiator and to the distance of said one radiator from a point common to all corresponding radiators in said bank of arrays and the frequency differences between the wave signals applied to the radiators in each array and between the wave signals applied to corresponding radiators in said bank of arrays having predetermined values related to the desired rates of scanning by said radiated-signal beam in two directions, whereby said radiated-signal system angularly scans with a radiated-signal beam and in two directions normal to each other a predetermined space.

20. A system for scanning a predetermined space with a radiated-signal beam comprising, a radiating system including a plurality of equally spaced signal radiators grouped into linear arrays and at least one linear bank of arrays, and wave-signal supply means coupled to said radiators including means for applying to said radiators wave signals having individual frequencies which increase in the order of spacing of said radiators in each array and increase in the order of spacing of each array in said bank of arrays, the wave signals applied to adjacent radiators in each array having a frequency difference of a first predetermined value and the wave signals applied to corresponding adjacent radiators in said bank of arrays having a frequency difference of a second predetermined value which first and second predetermined values are related to the desired rates of scanning by said radiated-signal beam in two directions, whereby said radiated-signal system angularly scans with a radiated-signal beam and in two directions normal to each other a predetermined space.

HAROLD M. LEWIS.